__(12)__ United States Patent
Price (10) Patent No.: US 12,125,495 B2
(45) Date of Patent: Oct. 22, 2024

(54) METHOD AND APPARATUS FOR PROCESSING AN AUDIO SIGNAL STREAM TO ATTENUATE AN UNWANTED SIGNAL PORTION

(71) Applicant: Calrec Audio Limited, Hebden Bridge West Yorkshire (GB)

(72) Inventor: Caleb Maynard Price, Leeds West Yorkshire (GB)

(73) Assignee: Calrec Audio Limited, West Yorkshire (GB)

( * ) Notice: Subject to any disclaimer, the term of this patent is extended or adjusted under 35 U.S.C. 154(b) by 578 days.

(21) Appl. No.: 17/271,128

(22) PCT Filed: Aug. 19, 2019

(86) PCT No.: PCT/GB2019/052323
§ 371 (c)(1),
(2) Date: Feb. 24, 2021

(87) PCT Pub. No.: WO2020/049269
PCT Pub. Date: Mar. 12, 2020

(65) Prior Publication Data
US 2021/0327450 A1    Oct. 21, 2021

(30) Foreign Application Priority Data
Sep. 5, 2018    (GB) ...................... 1814408

(51) Int. Cl.
*G10L 21/0232*    (2013.01)
*G06F 3/16*    (2006.01)
*G10L 19/022*    (2013.01)

(52) U.S. Cl.
CPC .......... *G10L 21/0232* (2013.01); *G06F 3/165* (2013.01); *G10L 19/022* (2013.01)

(58) Field of Classification Search
CPC ...... G10L 21/023; G10L 19/022; G06F 3/165
See application file for complete search history.

(56) References Cited

U.S. PATENT DOCUMENTS 4,966,252 A * 10/1990 Drever ................... H04R 1/086
  381/189
5,706,394 A *  1/1998 Wynn ..................... H04M 3/18
  704/226

(Continued)

FOREIGN PATENT DOCUMENTS

EP          0797313       9/1997
WO     WO2012102977       8/2012

OTHER PUBLICATIONS

Cao et al., VOice Avitivty Detection Algorithm Based on Entropy in Noisy Environment, 2016, IEEE, whole documentt (Year: 2016).*

(Continued)

*Primary Examiner* — Sonia L Gay
(74) *Attorney, Agent, or Firm* — Michael J Porco; Gerald E Hespos (57) ABSTRACT

A method of processing an audio signal stream to attenuate an unwanted signal portion, the method comprising the steps of
(a) providing a filter block having an input port and an output port, the filter block having an inactive state in which signals pass from the input port to the output port without being filtered and an active state in which signals are filtered to attenuate an unwanted signal portion as they pass from the input port to the output port;
(b) providing the audio signal stream to the input port of the filter; and,
(c) whilst the audio signal stream is being provided to the input port of the filter—

(Continued)

(i) calculating the entropy of at least a portion of the audio signal stream;
(ii) comparing the calculated entropy to a threshold value; and,
(iii) setting the state of the filter block to be either active or inactive depending on the comparison between the calculated entropy and the threshold value.

18 Claims, 7 Drawing Sheets

(56) References Cited

U.S. PATENT DOCUMENTS

| | | | |
|---|---|---|---|
| 2009/0287480 | A1 | 11/2009 | Mapes-Riordan et al. |
| 2016/0155441 | A1* | 6/2016 | Panda .................... G10L 25/51 704/233 |
| 2017/0372719 | A1* | 12/2017 | Li .......................... G10L 15/02 |
| 2018/0315443 | A1* | 11/2018 | Tan ........................ G10L 25/84 |
| 2020/0058320 | A1* | 2/2020 | Liu ........................ G10L 15/22 |

OTHER PUBLICATIONS

Hemant Misra et al., Spectral Entropy Based Feature for Robust ASR, Dalle Molle Institute for Perceptual Intelligence (IDIAP) Martigny, Switzerland, Copyright 2004 IEEE, pp. I-193-I-196.
International Search Report for PCT Application No. PCT/GB2019/052323; dated Oct. 21, 2019; two (2) pages.
UK Search Report for Application No. GB1911862.9; dated Feb. 12, 2020; three (3) pages.

* cited by examiner

METHOD AND APPARATUS FOR PROCESSING AN AUDIO SIGNAL STREAM TO ATTENUATE AN UNWANTED SIGNAL PORTION

This application is a U.S. national phase application of PCT Application no. PCT/GB2019/052323 filed on Aug. 19, 2019, which claims priority to United Kingdom Patent Application No. GB 1814408.9 filed on Sep. 5, 2018, the disclosure of which is hereby incorporated by reference.

The present invention relates to a method of processing an audio signal stream to attenuate an unwanted signal portion. More particularly, but not exclusively the present invention relates to a method of processing an audio signal stream to attenuate an unwanted signal portion comprising the steps of calculating the entropy of a portion of the signal stream, comparing the calculated value to a threshold value and switching a filter to which the audio signal stream is provided between active and inactive states depending on the result of the comparison. The present invention also relates to an apparatus for processing an audio signal stream to attenuate an unwanted signal portion. More particularly, but not exclusively, the present invention relates to an apparatus for processing an audio signal stream to attenuate an unwanted signal portion comprising a filter block, an entropy calculator and a comparator, the entropy calculator being adapted to calculate the entropy of at least a portion of the audio signal stream and provide it to the comparator, the comparator being adapted to compare the calculated entropy to a threshold value and to set the state of the filter depending on the comparison.

Within the sound recording and broadcast industries the audible phenomena of 'sibilance' is well known and generally considered to be undesirable. Consequently, measures are routinely taken in the recording and broadcast studio to reduce the degree of sibilance as a proportion of the overall voice level.

Sibilance is the unpleasant tonal harshness that accompanies certain 'fricative' consonants (eg s, t or z) produced by the human voice. The term 'fricative' describes those sounds which are created by forcing air through a narrow channel, such as those created by the gap between lip, tongue or teeth or between adjacent teeth. The resultant turbulent airflow is called frication. Whilst sibilance is a common feature of speech or singing it can often be significantly exaggerated by the close proximity of a microphone to the vocal source, which is typically the case in a recording or broadcast environment.

It is known to employ physical techniques to remove sibilance. Typically this is through the use of a microphone 'windshield' or 'pop guard'. Such measures are not always adequate and they may lead to adversely affecting the captured sound, such as increasing the relative level of background noise, or attenuating certain frequency ranges.

It is also known to employ electronic measures to remove sibilance. Such sibilance removal devices (de-essers) share a common approach and rely on the relatively high frequency energy content of sibilant voice as the distinguishing characteristic. However, if the voice happens to be particularly rich in high frequency harmonics then it is possible that non-sibilant sound will be erroneously removed.

The present invention seeks to overcome the problems of the prior art.

Accordingly, in a first aspect, the present invention provides a method of processing an audio signal stream to attenuate an unwanted signal portion, the method comprising the steps of (a) providing a filter block having an input port and an output port, the filter block having an inactive state in which signals pass from the input port to the output port without being filtered and an active state in which signals are filtered to attenuate an unwanted signal portion as they pass from the input port to the output port;

(b) providing the audio signal stream to the input port of the filter; and, (c) whilst the audio signal stream is being provided to the input port of the filter—
 (i) calculating the entropy of at least a portion of the audio signal stream;
 (ii) comparing the calculated entropy to a threshold value; and,
 (iii) setting the state of the filter block to be either active or inactive depending on the comparison between the calculated entropy and the threshold value.

The method according to the invention enables the accurate identification and attenuation of sibilance from an audio signal stream, even when the content of the audio signal stream is rich in high frequency harmonics.

Preferably steps (c)(i) to (c)(iii) are repeatedly performed whilst the input stream is provided to the input port of the filter block.

Preferably the step of calculating the entropy of at least a portion of the audio signal stream comprises the steps of
 (i) performing a discrete wavelet transform of the at least a portion of the audio signal stream; and,
 (ii) calculating the entropy of the at least a portion of the audio signal stream from the formula $$\text{Entropy} = -\frac{1}{\log(M)} \sum_s W(s) \cdot \log[WS(s)]$$

where s is the wavelet scale,
 WS(s) is wavelet coefficient power for a particular scale as a proportion of all scales; and
 M is the number of scales.

Preferably the at least a portion of the audio signal stream comprises the portion of the audio signal stream within a time window, extending backwards in time from the most recent element of the audio signal stream.

Preferably $M=2^N$, where N is an integer greater than 1.

Alternatively the step of calculating the entropy of at least a portion of the audio signal stream comprises the steps of
 (i) dividing the at least a portion of the audio signal stream into a plurality of filtered audio streams, each in a different frequency band B;
 (ii) calculate the power $W_s$ in each frequency band B as a proportion of the total for all bands; and,
 (iii) calculate the entropy of the at least a portion of the audio signal stream from the formula $$\text{Entropy} = -\frac{1}{\log(M)} \sum_B W_B \cdot \log[W_B]$$

where M is equal to the number of bands.

Alternatively the step of calculating the entropy of at least a portion of the audio signal stream comprises the steps of
 (i) performing a Fourier transform of the at least a portion of the audio signal stream; and, (ii) calculating the entropy of the at least a portion of the audio signal stream from the formula $$\text{Entropy} = -\frac{1}{\log(M)} \sum_f C(f) \cdot \log[C(f)]$$

where f is the index of the frequency domain Fourier component;

C(f) is the component power for a particular frequency domain Fourier component as a proportion of the component power of all frequency domain Fourier components; and, M is the number of resolved frequency domain Fourier components.

Preferably the Fourier transform is a discrete Fourier transform.

Preferably the at least a portion of the audio signal stream comprises the portion of the audio signal stream within a time window, extending backwards in time from the most recent element of the audio signal stream.

Preferably the unwanted signal portion comprises sibilance.

Alternatively the unwanted signal portion comprises breathing noise or wind noise.

In a further aspect of the invention there is provided an apparatus for processing an audio signal stream to attenuate an unwanted signal portion, the apparatus comprising
- a filter block having an input port and an output port, the filter block having an inactive state in which signals pass from the input port to the output port without being filtered and an active state in which signals are filtered to attenuate an unwanted signal portion as they pass from the input port to the output port;
- an entropy calculator adapted to receive at least a portion of the audio signal stream and calculate the entropy of that portion; and,
- a comparator connected between the entropy calculator and the filter block, the comparator being adapted to receive the calculated entropy from the entropy calculator, compare it to a threshold value and provide an activation signal to the filter block if the entropy exceeds the threshold value, the activation signal setting the filter to the active state.

Preferably the comparator provides an inactivation signal to the filter block if the calculated entropy is less than the threshold value, the inactivation signal setting the filter block to the inactive state.

Preferably the entropy calculator comprises a Discrete Wavelet Transform block adapted to perform a discrete wavelet transform of the at least a portion of the audio signal stream; and,
- a summation block adapted to receive the output of the Discrete Wavelet Transform block and calculate the entropy of the at least a portion of the audio signal stream from the formula $$\text{Entropy} = -\frac{1}{\log(M)} \sum_s W(s) \cdot \log[WS(s)]$$

where s is the wavelet scale,

WS(s) is wavelet coefficient power for a particular scale as a proportion of all scales; and M is the number of scales.

Alternatively the entropy calculator comprises a filter bank adapted to divide the at least a portion of the audio signal stream into a plurality of filtered audio streams, each in a different band 8; and,
- a summation block adapted to receive the output of the filter bank and calculate the entropy of the at least a portion of the audio signal stream from the formula $$\text{Entropy} = -\frac{1}{\log(M)} \sum_B W_B \cdot \log[W_B]$$

where M is equal to the number of bands and $W_B$ is the power in each frequency band as a proportion of the total for all bands.

Alternatively the entropy calculator comprises a Fourier transform block adapted to perform a Fourier transform of the at least a portion of the audio signal stream; and
- a summation block adapted to receive the output of the Fourier transform block and calculate the entropy of the at least a portion of the audio signal stream from the formula $$\text{Entropy} = -\frac{1}{\log(M)} \sum_f C(f) \cdot \log[C(f)]$$

where f is the index of the frequency domain Fourier component;

C(f) is the component power for a particular frequency domain Fourier component as a proportion of the component power of all frequency domain Fourier components; and, M is the number of resolved frequency domain components.

Preferably the Fourier transform is a discrete Fourier transform.

Preferably at least a portion of the entropy calculator is implemented as microprocessor.

Preferably at least a portion of the entropy calculator is implemented as FPGA.

The present invention will now be described by way of example only and not in any limitative sense with reference to the accompanying drawings in which.

Figure 1:
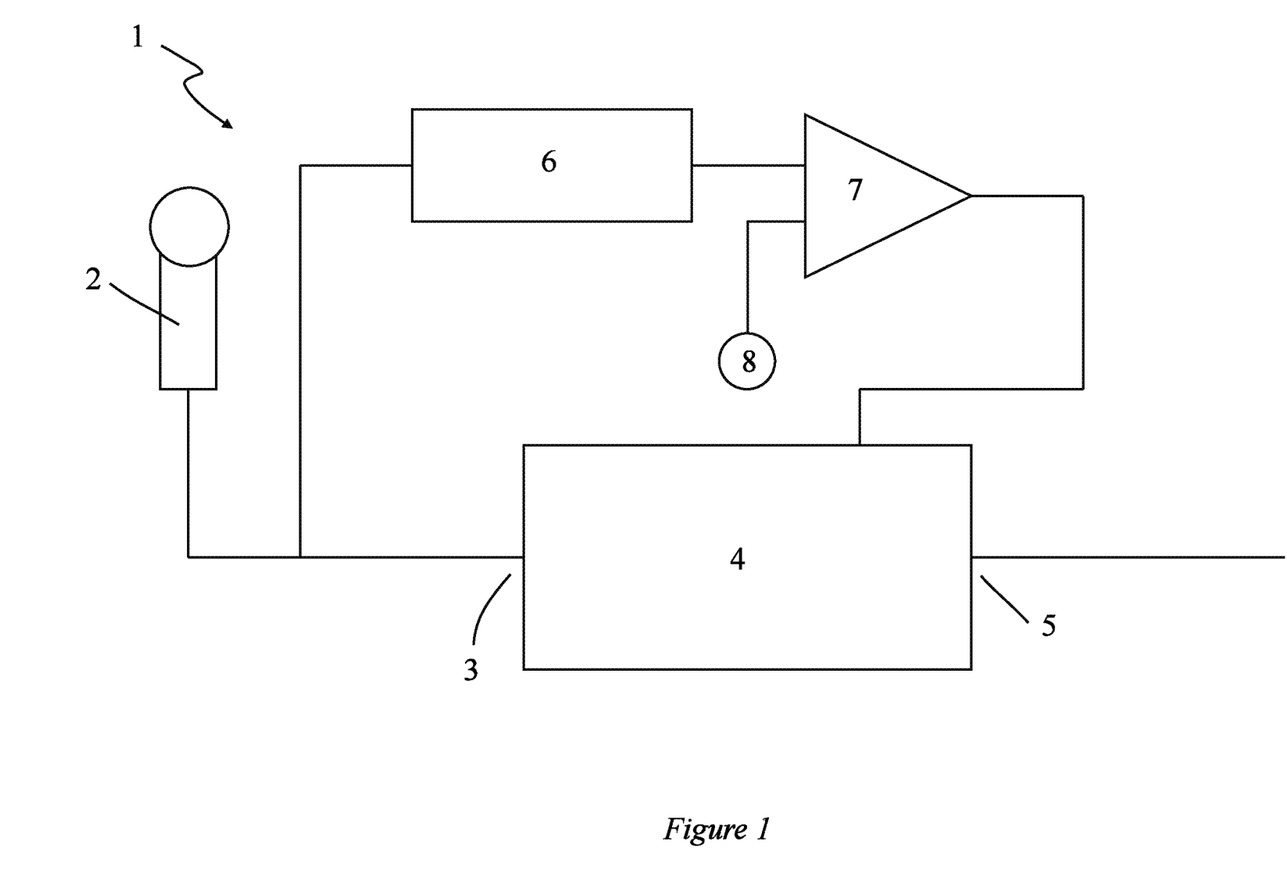
FIG. 1 shows, in schematic form, an apparatus for processing an audio signal stream to attenuate an unwanted signal portion.

Shown in FIG. 1, in schematic form, is an apparatus 1 for processing an audio signal stream to attenuate an unwanted signal portion. The apparatus 1 comprises an audio signal stream source 2, in this case a microphone 2. The microphone 2 provides the audio signal stream to the input port 3 of a filter block 4. The audio signal stream passes through the filter block 4 to an output port 5. The filter block 4 has an inactive state. In the inactive state the audio signal stream passes through the filter block 4 from the input port 3 to the output port 5 unaltered. The filter block 4 also has an active state. In the active state the audio signal stream is filtered to attenuate the unwanted signal portion as it passes from the input port 3 to the output port 5. The filter block 4 is described in more detail with reference to FIG. 2.

The apparatus 1 further comprises an entropy calculator 6. The microphone 2 further provides the audio signal stream to the entropy calculator 6. The entropy calculator 6 calculates the entropy of a portion of the audio signal stream. Typically this portion is the portion of the audio signal stream in a time window from the most recent element of the stream provided to the entropy calculator 6 backwards in time by the width T of the time window.

The apparatus 1 further comprises a comparator 7. The comparator 7 receives the calculated entropy from the entropy calculator 6 and compares it to a stored threshold value 8. If the calculated entropy is less than the threshold value 8 then it is assumed that the portion of the audio signal stream does not contain an unwanted signal portion. Accordingly, the comparator 7 provides an inactivation signal to the filter block 4 which sets the filter block 4 in the inactive state. If the calculated entropy is larger than the threshold value 8 then it is assumed that the portion of the audio signal stream contains an unwanted signal portion to be removed. The comparator 7 sends an activation signal to the filter block 4 so setting the filter block 4 in the active state. In this state the filter block 4 filters the audio signal stream passing through it, attenuating the unwanted signal portion.

An example of a typical audio signal stream is an audio signal stream comprising speech or singing. The unwanted signal portion is sibilance. The invention is not so limited however. The unwanted signal portion could for example be the sound of breathing, wind noise or any other noise having a high degree of entropy.

Figure 2:
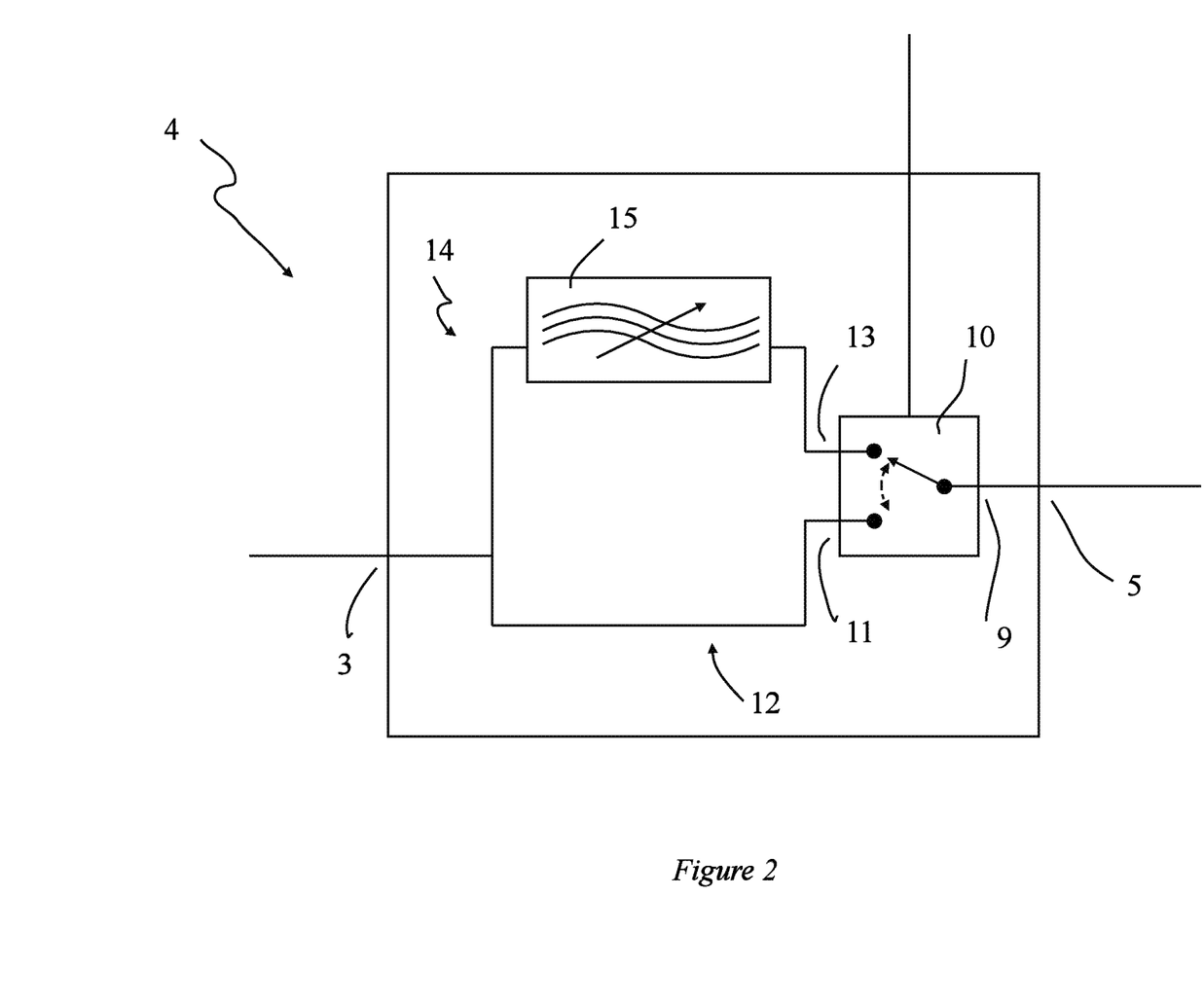
FIG. 2 shows the filter block of the embodiment of FIG. 1 in more detail.

Shown in FIG. 2 is an embodiment of a filter block 4 of an apparatus 1 according to the invention. The filter block 4 comprises an input port 3 and an output port 5. Connected to the output port 5 is the output 9 of a cross fader 10. A first input 11 of the cross fader 10 is connected to a first signal path 12 which is connected to the input port 3 of the filter block 4. A second input 13 of the cross fader 10 is connected to a second signal path 14 which is also connected to the input port 3 of the filter block 4. A filter 15 is arranged in the second signal path 14. The output of the comparator 7 is connected to the cross fader 10 to control the cross fader 10.

If the comparator 7 sends an inactive signal to the cross fader 10 then the cross fader 10 switches to a first position in which the first input 11 of the cross fader 10 is connected to the output 9 of the cross fader 10. The audio signal stream therefore passes from the filter block input port 3, along the first signal path 12, through the cross fader 10 to the output port 9 of the filter block 4. The audio signal stream is unamended as it passes through the filter block 4.

If the comparator 7 sends an active signal to the cross fader 10 then the cross fader 10 switches to a second position in which the second input 13 of the cross fader 10 is connected to the output 9 of the cross fader 10. This is the position shown in FIG. 2. The audio signal stream passes from the filter block input port 3, along the second filter path 14 through the filter 15 and then the cross fader 10 to the output 5 of the filter block 4. The audio signal stream is filtered as it passes through the filter 15, attenuating the unwanted signal portion.

A wide variety of filters 15 are known in the art which have a frequency dependent response suitable for attenuating an unwanted signal portion in an audio signal stream. The filter 15 can be an analogue filter or more typically is a digital filter.

Figure 3:
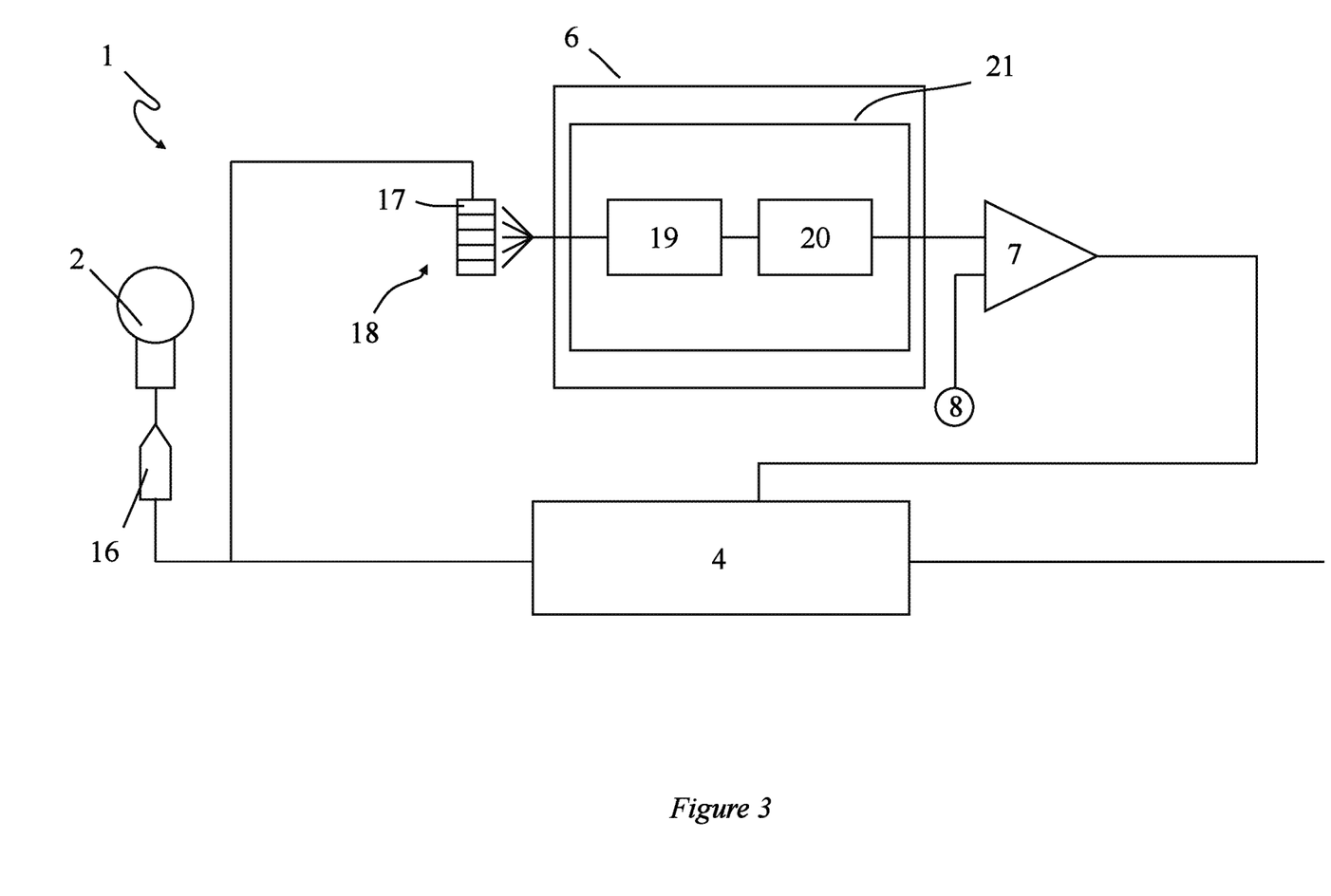
FIG. 3 shows the embodiment of FIG. 1 in more detail.

Shown in FIG. 3 is the embodiment of the apparatus 2 according to the invention of FIG. 1 shown in more detail. The audio signal stream from the microphone 2 passes through an analogue to digital converter 16 which converts the audio signal stream into a series of elements 17. The elements 17 are passed into a rolling buffer 18 which stores the elements 17 from the most recent back in time by a time T. As a new element 17 is added to the buffer 18 the oldest element 17 is removed. Such buffers 18 are well known. The buffer 18 therefore holds the most recent portion of the audio signal stream of width T in time.

The entropy calculator 6 comprises a Discrete Wavelet Transform (DWT) block 19. The DWT block 19 receives all of the elements 17 in the buffer 18 and performs a discrete wavelet transform on them. The theory of the discrete wavelet transform is known and so will not be explained in detail.

Briefly, the portion of the audio signal stream contained within the buffer is x[t]. The DWT block produces a series of arrays of wavelet coefficients $x_s[k]$ where s is the scale and k is the wavelet translation factor. In this embodiment there are M scales where $M=2^N$ where N is an integer greater than 1.

For a fixed scale s the wavelet coefficient power for that scale is the sum of the square of the wavelet coefficients for that scale.

The series of arrays of wavelet coefficients $x_s[k]$ is passed from the DWT block 19 to a summation block 20. The summation block calculates the entropy of the portion of the audio signal stream held in the buffer 18 according to the formula $$\text{Entropy} = -\frac{1}{\log(M)} \sum_s W(s) \cdot \log[WS(s)]$$

WS(s) is wavelet coefficient power for a particular scale as a proportion of all scales.

The entropy calculated by the summation block 20 is passed to the comparator 7 as previously described.

Each time a new element 17 is added to the buffer 18 (and the oldest element 17 removed) the process is repeated with the entropy being recalculated and passed to the comparator 7 which sets the state of the filter block 4.

FIG. 3 shows a 'logical' representation of the entropy calculator 6. In practice the entropy calculator 6 is implemented as a microprocessor 21 which is programmed to perform the necessary steps to calculate the entropy.

Figure 4:
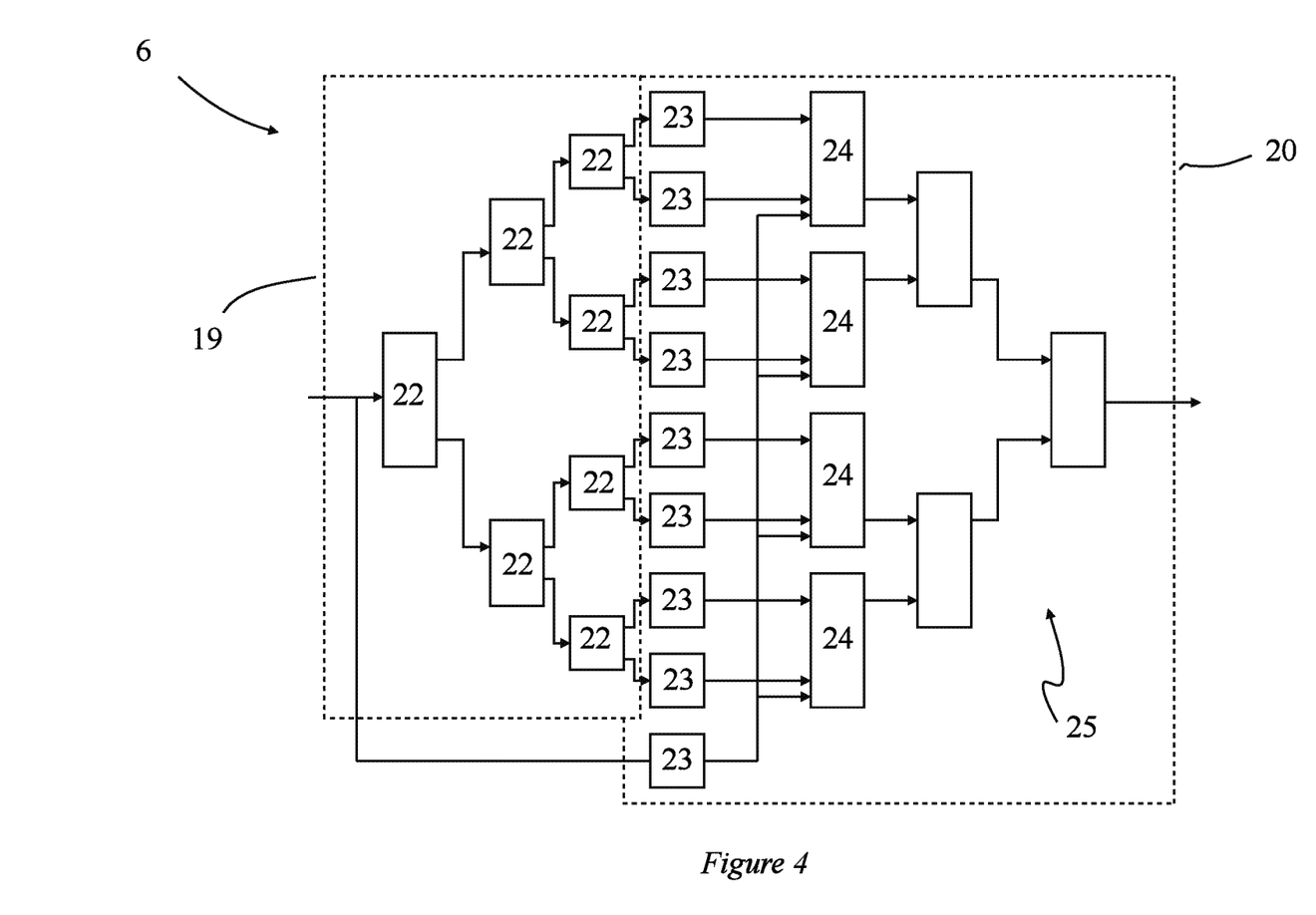
FIG. 4 shows a further embodiment of an entropy calculator of an apparatus according to the invention.

In an alternative embodiment of the invention the entropy calculator 6 is implemented as dedicated hardware such as an FPGA. FIG. 4 shows a dedicated implementation of the entropy calculator 6 as a FPGA.

As is known in the field of the discrete wavelet transform, a discrete wavelet transform can be performed by passing x[t] through a filter bank. The filter bank comprises a plurality of DWT stages. Each DWT stage comprises a high pass filter and low pass filter. By appropriate choice of high and low pass filters and frequency bands the detail coefficients obtained from a high pass filter in a particular band correspond to the wavelet coefficients at a particular scale s.

Turning now to FIG. 4, the DWT block 19 comprises a plurality of DWT stages 22. The applied signal x[t] is decomposed by the multiple DWT stages 22 with each successive stage 22 sub dividing the spectrum of the applied signal by a factor of two, thus doubling the number of frequency bands. Each DWT stage 22 also reduces the sample rate of the applied signal by a factor of two.

The outputs of the DWT stages 22 are then passed to the summation block 20. In the summation block 20 the power in each sub band is averaged following a $\log_2()$ operation over a specified analysis period in the 'Mean Log Squared' blocks 23. The $\log_2()$ operation is performed primarily to economise on memory requirements for the necessary moving average filter. It acts to compress 32 bit data to 8 bits, thus consuming a quarter of the memory to represent the same dynamic range.

The same 'Mean Log Squared' operation is applied also to the input signal prior to the DWT stages 22. In this case however the sample length of the moving average filter is increased proportionately such that the analysis period its output represents is equal to those of the processed sub bands (which have been downsampled by the successive DWT stages).

Following the 'Mean Log Squared' operations, the resultant averaged log power signals are processed by the 'Log Prod' blocks 24. Which perform the following operation—

$$\text{output} = -\{[A-Z] \cdot 2^{A-Z}] + [(B-Z) \cdot 2^{B-Z}]\}$$

where A and B are log power averaged DWT decomposed sub bands and Z is the log power averaged input.

Since all of these are log power quantities and Z is the log of the total power, then (A−Z) and (B−Z) represent the log power of the A and B sub band inputs as a proportion of the total power. By raising 2 to the power of (A−Z) and (B−Z) produces the base 2 antilogarithm of these values. Multiplying them by their resultant antilogarithm produces one term of the summation equation for entropy as set out above. The summation of these two terms and further summation with the outputs of all other Log Prod blocks by the adder chain 25 which follows produces, with appropriate scaling, the entropy calculated by the equation above.

Figure 5:
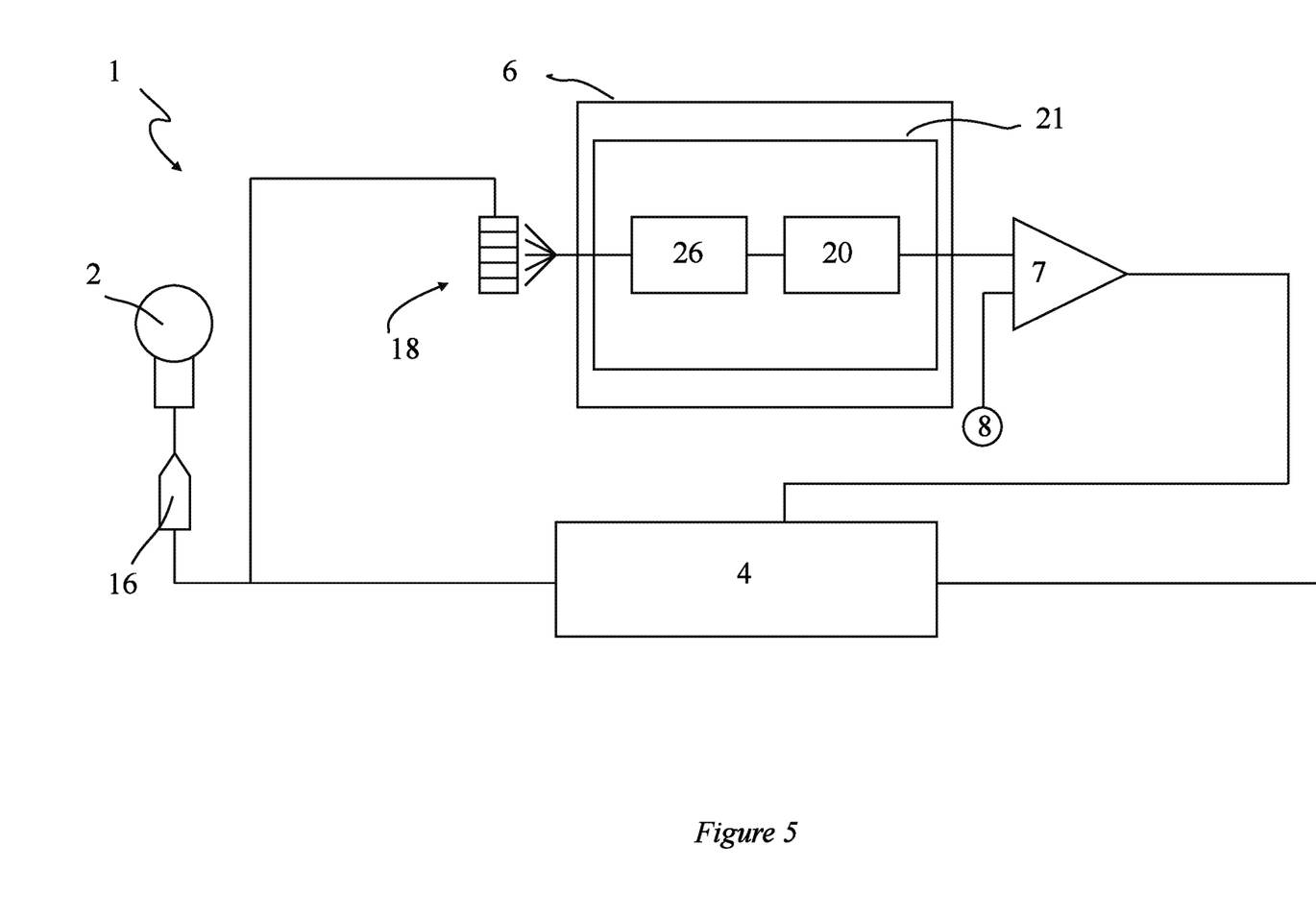
FIG. 5 shows a further embodiment of an apparatus according to the invention.

Approaches to entropy calculation other than the discrete wavelet transform are possible. Shown in FIG. 5 is a further embodiment of the apparatus 1 according to the invention. This is similar to that of FIG. 3 except the DWT block is replaced by a Fourier transform block 26, in this case a discrete Fourier transform block 26. The Fourier transform block 26 performs a discrete Fourier transform on the portion of the audio signal stream in the buffer 18 decomposing it into a plurality of frequency domain components each centred around a different frequency. Each component has an amplitude $a_f$. The output from the discrete Fourier transform block 26 is an array $x[a_f]$. The square of the amplitude is a measure of the power at frequency domain component f. C(f) is the component power for a particular frequency domain Fourier component as a proportion of the component power of all frequency domain Fourier components. In this embodiment there are M resolved frequency domain components.

The output from the Fourier transform block 26 is passed to the summation block 20 which calculates the entropy of the portion of the audio signal stream in the buffer from the formula—

$$\text{Entropy} = -\frac{1}{\log(M)} \sum_f C(f) \cdot \log[C(f)]$$

In this embodiment the discrete Fourier transform block 26 and summation block 20 are implemented as a microprocessor 21 programmed to take the necessary steps to calculate the entropy. In an alternative embodiment one or both of these blocks 20, 26 are implemented are dedicated components such as FPGAs.

Figure 6:
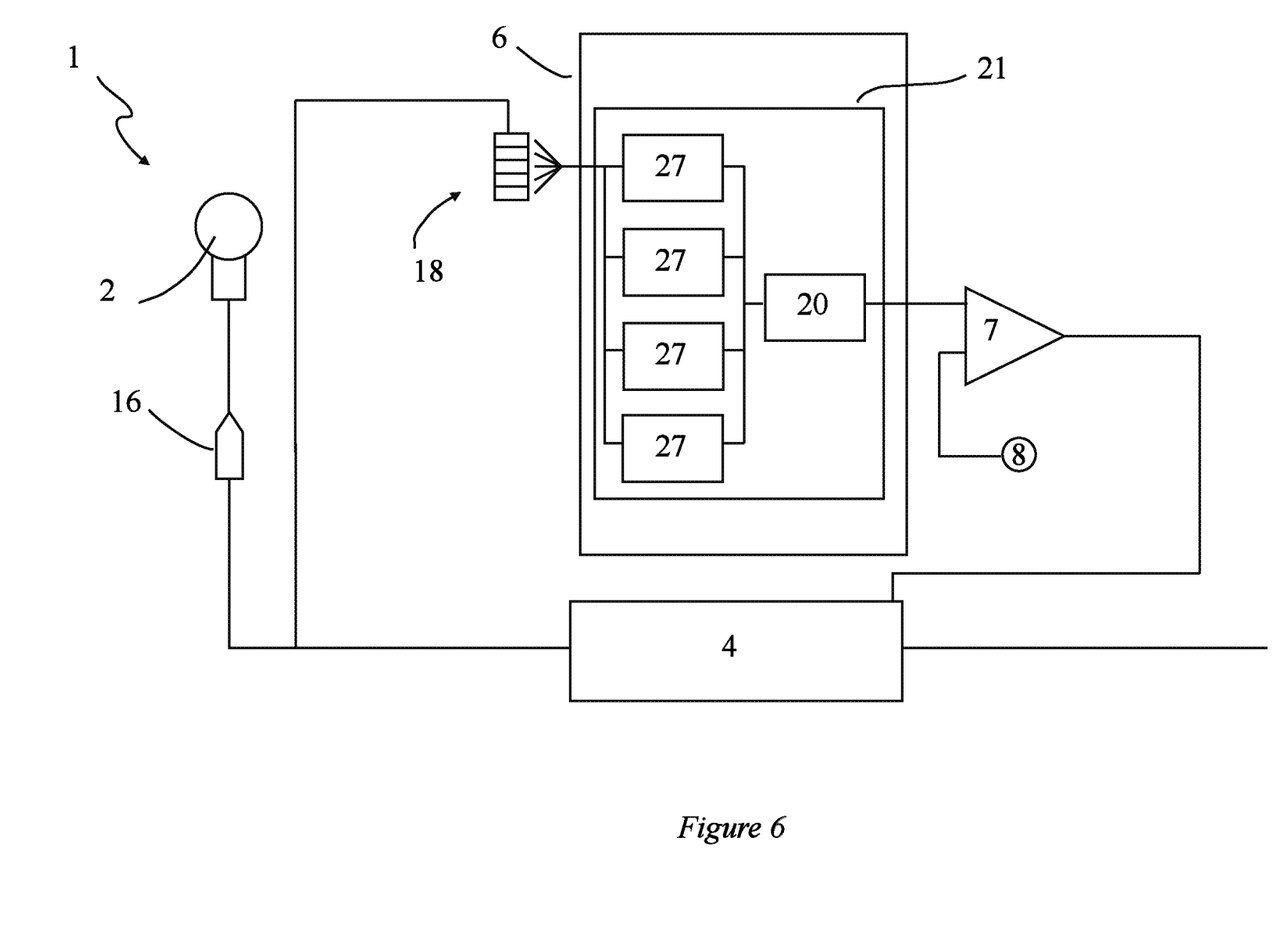
FIG. 6 shows a further embodiment of an apparatus according to the invention; and, FIG. 7 shows a further embodiment of an apparatus according to the invention.

Shown in FIG. 6 is a further embodiment of an apparatus 1 according to the invention. In this embodiment the entropy calculator 6 comprises a filter bank connected to a summation block 20. The filter bank comprises M filters 27 which divide the portion of the audio input stream in the buffer 18 into M filtered audio streams, each in a different frequency band B. In this embodiment the bands B do not overlap. The outputs from the filters 27 are passed to the summation block 20 which calculates the entropy in the portion of the audio signal stream according to the formula—

$$\text{Entropy} = -\frac{1}{\log(M)} \sum_B W_B \cdot \log[W_B]$$

where $W_B$ is the power in each frequency band as a proportion of the total for all bands.

Figure 7:
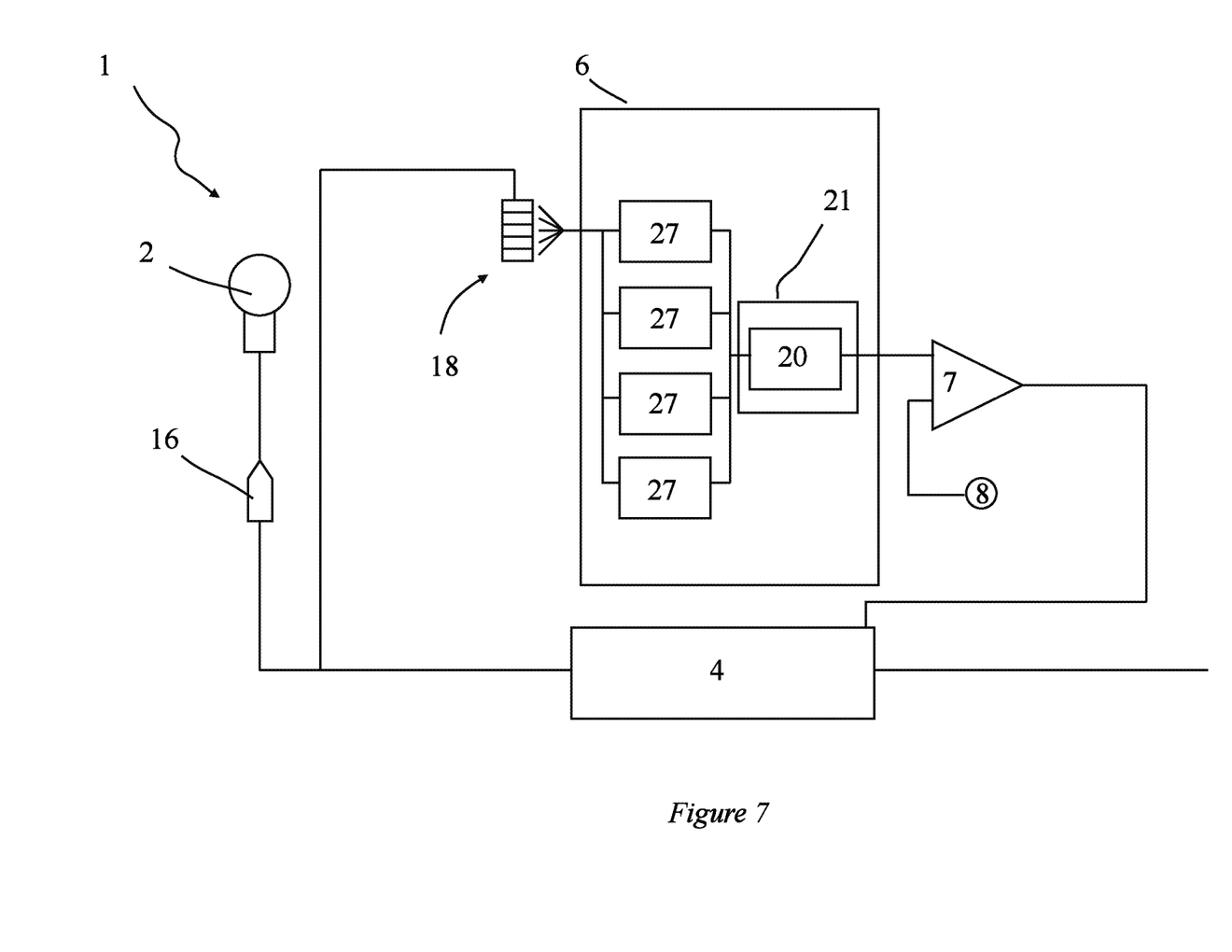

In the embodiment of FIG. 6 the entropy calculator 6 is implemented as a microprocessor 21 programmed to perform the necessary steps. FIG. 7 shows a variant of the embodiment of FIG. 6. In the embodiment of FIG. 7 only the summation block 20 is implemented as a microprocessor 21. The filter block is implemented as dedicated circuitry, for example an FPGA or an operational amplifier.

The invention claimed is:

1. A method of processing an audio signal stream to attenuate an unwanted signal portion, the unwanted signal portion comprising sibilance, the method comprising:
   (a) providing a filter block having an input port and an output port, the filter block having an inactive state in which signals pass from the input port to the output port without being filtered and an active state in which signals are filtered to attenuate an unwanted signal portion as the signals pass from the input port to the output port;
   (b) providing the audio signal stream to the input port of the filter; and,
   (c) whilst the audio signal stream is being provided to the input port of the filter—
      (i) calculating the entropy of at least a portion of the audio signal stream;
      (ii) comparing the calculated entropy to a threshold value, the calculated entropy exceeding the threshold being indicative of the audio signal stream containing the unwanted signal portion; and,
      (iii) setting the state of the filter block to be either active or inactive depending on the comparison between the calculated entropy and the threshold value,
      wherein the filter block is set to be active when the calculated entropy exceeds the threshold value.

2. A method as claimed in claim 1 wherein steps (c) (i) to (c) (iii) are repeatedly performed whilst the input stream is provided to the input port of the filter block.

3. A method as claimed in claim 1, wherein the step of calculating the entropy of at least a portion of the audio signal stream comprises the steps of
   (i) performing a discrete wavelet transform of the at least a portion of the audio signal stream; and,
   (ii) calculating the entropy of the at least a portion of the audio signal stream from the formula $$\text{Entropy} = -\frac{1}{\log(M)} \sum_s W(s) \cdot \log[WS(s)]$$

where s is the wavelet scale,
WS(s) is wavelet coefficient power for a particular scale as a proportion of all scales; and
M is the number of scales.

4. A method as claimed in claim 3, wherein the at least a portion of the audio signal stream comprises the portion of the audio signal stream within a time window, extending backwards in time from the most recent element of the audio signal stream.

5. A method as claimed in claim 3, wherein $M=2^N$, where N is an integer greater than 1.

6. A method as claimed in claim 1, wherein the step of calculating the entropy of at least a portion of the audio signal stream comprises the steps of
   (i) dividing the at least a portion of the audio signal stream into a plurality of filtered audio streams, each of the plurality of filtered audio streams in a different frequency band B;
   (ii) calculate the power $W_B$ in each frequency band B as a proportion of the total for all bands; and,
   (iii) calculate the entropy of the at least a portion of the audio signal stream from the formula $$\text{Entropy} = -\frac{1}{\log(M)} \sum_B W_B \cdot \log[W_B]$$

where M is equal to the number of bands.

7. A method as claimed in claim 1, wherein the step of calculating the entropy of at least a portion of the audio signal stream comprises the steps of
   (i) performing a Fourier transform of the at least a portion of the audio signal stream; and,
   (ii) calculating the entropy of the at least a portion of the audio signal stream from the formula $$\text{Entropy} = -\frac{1}{\log(M)} \sum_f C(f) \cdot \log[C(f)]$$

where
f is the index of the frequency domain Fourier component;
C(f) is the component power for a particular frequency domain Fourier component as a proportion of the component power of all frequency domain Fourier components; and,
M is the number of resolved frequency domain Fourier components.

8. A method as claimed in claim 7, wherein the Fourier transform is a discrete Fourier transform.

9. A method as claimed in claim 7, wherein the at least a portion of the audio signal stream comprises the portion of the audio signal stream within a time window, extending backwards in time from the most recent element of the audio signal stream.

10. An apparatus for processing an audio signal stream to attenuate an unwanted signal portion, the unwanted signal portion comprising sibilance, the apparatus comprising:
   a filter block having an input port and an output port, the filter block having an inactive state in which signals pass from the input port to the output port without being filtered and an active state in which signals are filtered to attenuate an unwanted signal portion as the signals pass from the input port to the output port;
   an entropy calculator that receives at least a portion of the audio signal stream and calculate the entropy of that portion; and,
   a comparator coupled to the entropy calculator and the filter block, the comparator receives the calculated entropy from the entropy calculator, compares the calculated entropy to a threshold value and provides an activation signal to the filter block if the calculated entropy exceeds the threshold value, the activation signal setting the filter to the active state, wherein the calculated entropy exceeding the threshold being indicative of the audio signal stream containing the unwanted signal portion.

11. An apparatus as claimed in claim 10, wherein the comparator provides an inactivation signal to the filter block if the calculated entropy is less than the threshold value, the inactivation signal setting the filter block to the inactive state.

12. An apparatus as claimed in claim 10, wherein the entropy calculator comprises a Discrete Wavelet Transform block adapted to perform a discrete wavelet transform of the at least a portion of the audio signal stream; and,
   a summation block that receives the output of the Discrete Wavelet Transform block and calculates the entropy of the at least a portion of the audio signal stream from the formula $$\text{Entropy} = -\frac{1}{\log(M)} \sum_s W(s) \cdot \log[WS(s)]$$

where s is the wavelet scale,
WS(s) is wavelet coefficient power for a particular scale as a proportion of all scales; and
M is the number of scales.

13. An apparatus as claimed in claim 10, wherein the entropy calculator comprises a filter bank that divides the at least a portion of the audio signal stream into a plurality of filtered audio streams, each of the plurality of filtered audio streams in a different band B; and,
   a summation block that receives the output of the filter bank and calculates the entropy of the at least a portion of the audio signal stream from the formula $$\text{Entropy} = -\frac{1}{\log(M)} \sum_B W_B \cdot \log[W_B]$$

where M is equal to the number of bands and
$W_B$ is the power in each frequency band as a proportion of the total for all bands.

14. An apparatus as claimed in claim 10, wherein the entropy calculator comprises a Fourier transform block that performs a Fourier transform of the at least a portion of the audio signal stream; and
   a summation block that receives the output of the Fourier transform block and calculates the entropy of the at least a portion of the audio signal stream from the formula $$\text{Entropy} = -\frac{1}{\log(M)} \sum_f C(f) \cdot \log[C(f)]$$

where f is the index of the frequency domain Fourier component;

C(f) is the component power for a particular frequency domain Fourier component as a proportion of the component power of all frequency domain components; and, M is the number of resolved frequency domain Fourier components.

15. An apparatus as claimed in claim 14, wherein the Fourier transform is a discrete Fourier transform.

16. An apparatus as claimed in claim 10, wherein at least a portion of the entropy calculator is implemented as a microprocessor.

17. An apparatus as claimed in claim 10, wherein at least a portion of the entropy calculator is implemented as a FPGA.

18. An apparatus as in claimed in claim 10, wherein the filter block includes:
   a filter having a frequency dependent response for attenuating the unwanted signal portion, an input of the filter connected to the input port of the filter block; and
   a cross fader having a first input connected to the input port of the filter block and a second input connected to the output of the filter, an output of the cross fader connected to the output port of the filter block,
   wherein an output of the comparator is connected to the cross fader to control the cross fader, the output of the comparator provides the activation signal to the cross fader.

* * * * *